Figure 1:
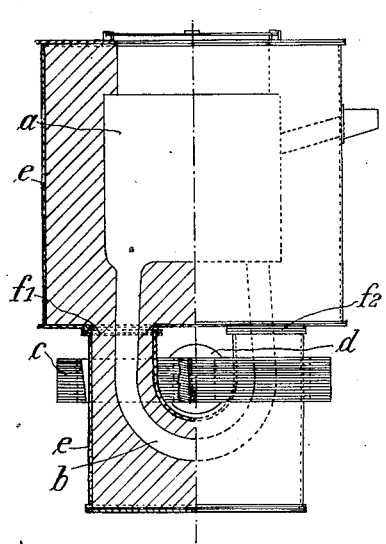

Aug. 4, 1942.      H. SCHUNK      2,291,835

LOW-FREQUENCY INDUCTION FURNACE

Filed April 18, 1940

Hermann Schunk  Inventor

By his Attorneys
Hurtz and Joslin

Patented Aug. 4, 1942

2,291,835

UNITED STATES PATENT OFFICE 2,291,835

LOW-FREQUENCY INDUCTION FURNACE

Herman Schunk, Bitterfeld, Germany

Application April 18, 1940, Serial No. 330,276
In Germany April 29, 1939

6 Claims. (Cl. 13—29)

When using low-frequency induction furnaces for the melting of metals or alloys, the secondary circuit of the furnace transformer is formed by the melting pot together with the so-called "channel," i. e. a substantially U-shaped passage filled with molten metal and connected, at both its ends, with the melting pot. Instead of a single melting pot, also several pots may be disposed in a single furnace.

The application of low-frequency induction furnaces of the aforesaid kind in processes involving the application of a more or less complete vacuum or of an excess pressure (e. g. the distillation or degasification of metals or alloys with the aid of a vacuum) has hitherto hardly been attempted, because in this case not only the melting pot proper, but also the channel must be securely protected, in a pressure-tight manner, from the atmosphere. Since a metallic casing is the only reliable means for securing the desired air-tightness, this is tantamount to providing a metallic shell in a low-frequency induction furnace, which shell, as a unit completely surrounds both the melting pot and the channel. The provision of a metallic shell of this kind must, however, necessarily have a pronounced influence upon the electromagnetic conditions prevailing in the furnace in view of the fact that it is desired to transmit electric energy in large quantities by magnetic induction from the primary coil disposed outside the metallic skin to the channel disposed in the interior thereof and acting as the secondary.

The metallic shell thus lies in the immediate sphere of influence of the main energetic field of the furnace transformer as well as of the leakage field thereof, and also of the channel current. The main energetic field of the furnace transformer causes the generation of circular currents in the metal shell as well as in the channel, which currents surround the transformer core; the leakage field produces eddy currents at the points at which it passes through the shell; finally the electromagnetic field produced by the channel current causes an alternating magnetisation in such parts of the shell which are made of ferromagnetic material. Each of these phenomena causes an undesirable heating of the shell and also losses of energy.

It is an object of the present invention to provide a furnace construction of the type above referred to, in which these and other disadvantages are avoided to an extent no longer affecting the conditions of operation, if not completely. This is achieved by a special construction of the metallic shell which stands up well to breakage and does not impair its efficiency of protection against considerable external or internal excess pressure. In order to suppress the generation of circular currents in the metallic shell, the latter is according to one feature of the invention provided with a number—on occasion only a single—of joints which are electrically insulating while being stuffed so as to be resistant to pressure. In order to avoid the undesirable heating of the metallic shell by eddy currents produced by the leakage field of the furnace transformer, the shell, and particularly those portions thereof at which the leakage field penetrates through the shell, are, according to a further feature of the invention, designed with thin cross-sections and in a material having low electrical conductivity, thus to a large extent suppressing the generation of eddy currents; alternatively, the exposed parts of the shell are designed with heavy cross-sections, and made from a material having a high electrical conductivity, in which case the generated eddy currents while being of very considerable strength, cause a negligible loss of energy only owing to the low resistance of the material, while at the same time producing an electromagnetic field opposed to the leakage field. Finally the losses due to alternating magnetisation of the metallic coating are avoided, according to a further feature of the invention, by imparting a sufficiently high magnetic resistance to all those portions of the metallic shell which form closed sections surrounding the channel; this may be effected either by making at least the aforesaid portions of materials which are not ferro-magnetic, or by interposing, in the shell and in the direction of the electromagnetic field, sections of non-magnetic material.

Figure 2:
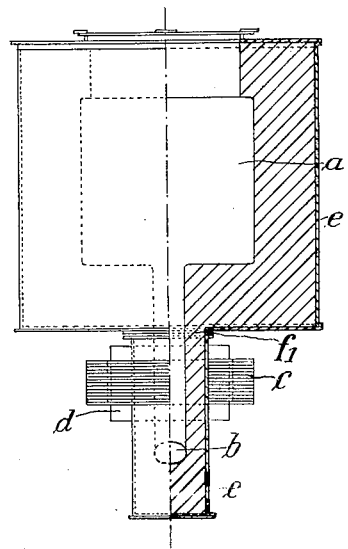
Figure 3:
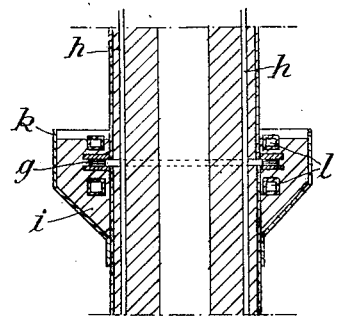

The invention is illustrated by way of example in the accompanying drawing:

Figs. 1 and 2 are elevations, partly in section, of an induction furnace according to the invention and Fig. 3 illustrates by way of example another type of joint that can be used in constructing the metallic shell.

In Figs. 1 and 2 $a$ is the melting pot, the bottom of which is connected to the ends of U-shaped channel $b$ so as to form the secondary circuit of the furnace. $c$ is the electromagnetic core made up of transformer sheets, and $d$ is the primary coil of the furnace transformer. The melting pot and the channel are surrounded by a pressure-tight metallic shell $e$. In order to avoid the generation of circular currents in the metallic shell by the main field, electrically insulating joints $f1$ and $f2$ respectively are provided which are so stuffed as to be resistant to crushing. These joints may be mounted at any desired part of the channel as long as their position is such as to interrupt any possible closed path of current surrounding the transformer core. It is, however, preferable to arrange the joints, as illustrated in Figs. 1 and 2, in the angles formed by the melting pot and the transformer coil. When disposing the joints in said angles, it will not be necessary to increase the distance between the transformer coil and the channel in comparison with arrangement in the normal, i. e. non pressure-tight type of furnace, which distance, in order to avoid too large a leakage of the furnace transformer, should be kept as small as possible. Per se, it would be possible to design the aforesaid joints as rigid flange joints provided with an insulating stuffing and insulated screws. In an arrangement of this kind difficulties, however, arise by the creep of the ramming and/or of the lining; in the case of large furnaces this creep may amount up to 10 mm. In such cases it is no longer possible to readjust the stuffing of any leaking joints. This inconvenience may be overcome according to the present invention by constructing the joints as illustrated in Fig. 3 in this modification, the distance between the flanges forming the joint is maintained, by the insertion of a ring $g$ consisting of an insulating, heat-resisting material, e. g. asbestos. The jacket of the melting pot and that of the channel are held together by means of ties $h$ which must, of course, be fastened at least at one of their ends in an insulating manner. The tightness against unilateral pressure is attained by means of picein or a similar sealing material $i$ which is cast into a sheet iron trough $k$ provided for that purpose. The sealing material is kept at a sufficiently low temperature by a water-cooling pipe system $l$. If owing to the creep of the ramming or of the lining the joint begins to leak, this may be readily remedied by a mere heating of the sealing material.

Instead of the furnace having a single melting pot as illustrated in the drawing, there may be used a two-pot furnace in which the joints in the trough-section may likewise suitably be arranged in the angles between the primary coil and one of the two pots.

What I claim is:

1. Low frequency induction furnace to be operated with considerable pressure above and below atmospheric comprising a pressure-tight metallic shell, a lining forming a melting hearth and at the bottom of the latter an U-shaped channel, means for generating heat electrically in said channel by induction, said pressure-tight metallic shell enclosing the lining of the hearth and the channel, and being composed of several parts united by electrically insulating joints resistant against considerable gas pressure and interrupting any possible closed path of current, said joints being filled with a material which becomes plastic on heating to compensate for the creeping of the lining due to variations in temperature, said material being provided with means for regulating its temperature.

2. Low frequency induction furnace to be operated with considerable pressure above and below atmospheric comprising a pressure-tight metallic shell, a lining forming a melting hearth and at the bottom of the latter an U-shaped channel, means for generating heat electrically in said channel by induction, said pressure-tight metallic shell enclosing the lining of the hearth and the channel, and being composed of several parts, one of which surrounds the hearth and the other the channel, said parts being united by electrically insulating joints resistant against considerable gas pressure and interrupting any possible closed path of current, said joints being filled with a material which becomes plastic on heating to compensate for the creeping of the lining due to variations in temperature, said material being provided with means for regulating its temperature.

3. Low frequency induction furnace to be operated with considerable pressure above and below atmospheric comprising a pressure-tight metallic shell, a lining forming a melting hearth and at the bottom of the latter an U-shaped channel, means for generating heat electrically in said channel by induction, said pressure-tight metallic shell enclosing the lining of the hearth and the channel, and being of small cross-section and having poor electrical conductivity at those portions at which the leakage field penetrates and being composed of several parts united by electrically insulating joints resistant against considerable gas pressure and interrupting any possible closed path of current, said joints being filled with a material which becomes plastic on heating to compensate for the creeping of the lining due to variations in temperature, said material being provided with means for regulating its temperature.

4. Low frequency induction furnace to be operated with considerable pressure above and below atmospheric comprising a pressure-tight metallic shell, a lining forming a melting hearth and at the bottom of the latter an U-shaped channel, means for generating heat electrically in said channel by induction, said pressure-tight metallic shell enclosing the lining of the hearth and the channel, and being of large cross-section and having good electrical conductivity at those portions at which the leakage field penetrates and being composed of several parts united by electrically insulating joints resistant against considerable gas pressure and interrupting any possible closed path of current, said joints being filled with a material which becomes plastic on heating to compensate for the creeping of the lining due to variations in temperature, said material being provided with means for regulating its temperature.

5. Low frequency induction furnace to be operated with considerable pressure above and below atmospheric comprising a pressure-tight metallic shell, a lining forming a melting hearth and at the bottom of the latter an U-shaped channel, means for generating heat electrically in said channel by induction, said pressure-tight metallic shell enclosing the lining of the hearth and the channel, and being composed of several parts, the part enclosing the channel being of a non-magnetic material and being united with the other part by electrically insulating joints resistant against considerable gas pressure and interrupting any possible closed path of current, said joints being filled with a material which becomes plastic on heating to compensate for the creeping of the lining due to variations in temperature, said material being provided with means for regulating its temperature.

6. Low frequency induction furnace to be operated with considerable pressure above and below atmospheric comprising a pressure-tight metallic shell, a lining forming a melting hearth and at the bottom of the latter an U-shaped channel, means for generating heat electrically in said channel by induction, said pressure-tight metallic shell enclosing the lining of the hearth and the channel, and being composed of several parts united by electrically insulating joints resistant against considerable gas pressure and interrupting any possible closed path of current, said joints comprising sheet-iron means mounted around the parts to be joined and being filled with a material which becomes plastic on heating to compensate for the creeping of the lining due to variations in temperature, said material being provided with a water-cooling pipe system to keep it at a sufficiently low temperature.

HERMAN SCHUNK.